Aug. 8, 1950     E. O. ROGGENSTEIN     2,518,376
ELECTRICALLY OPERATED PRINTING MECHANISM
FOR RECORDING AND COMPUTING MACHINES
Original Filed Oct. 18, 1941     15 Sheets-Sheet 4

INVENTOR
E. O. ROGGENSTEIN
BY *John L. Sterling*
ATTORNEY

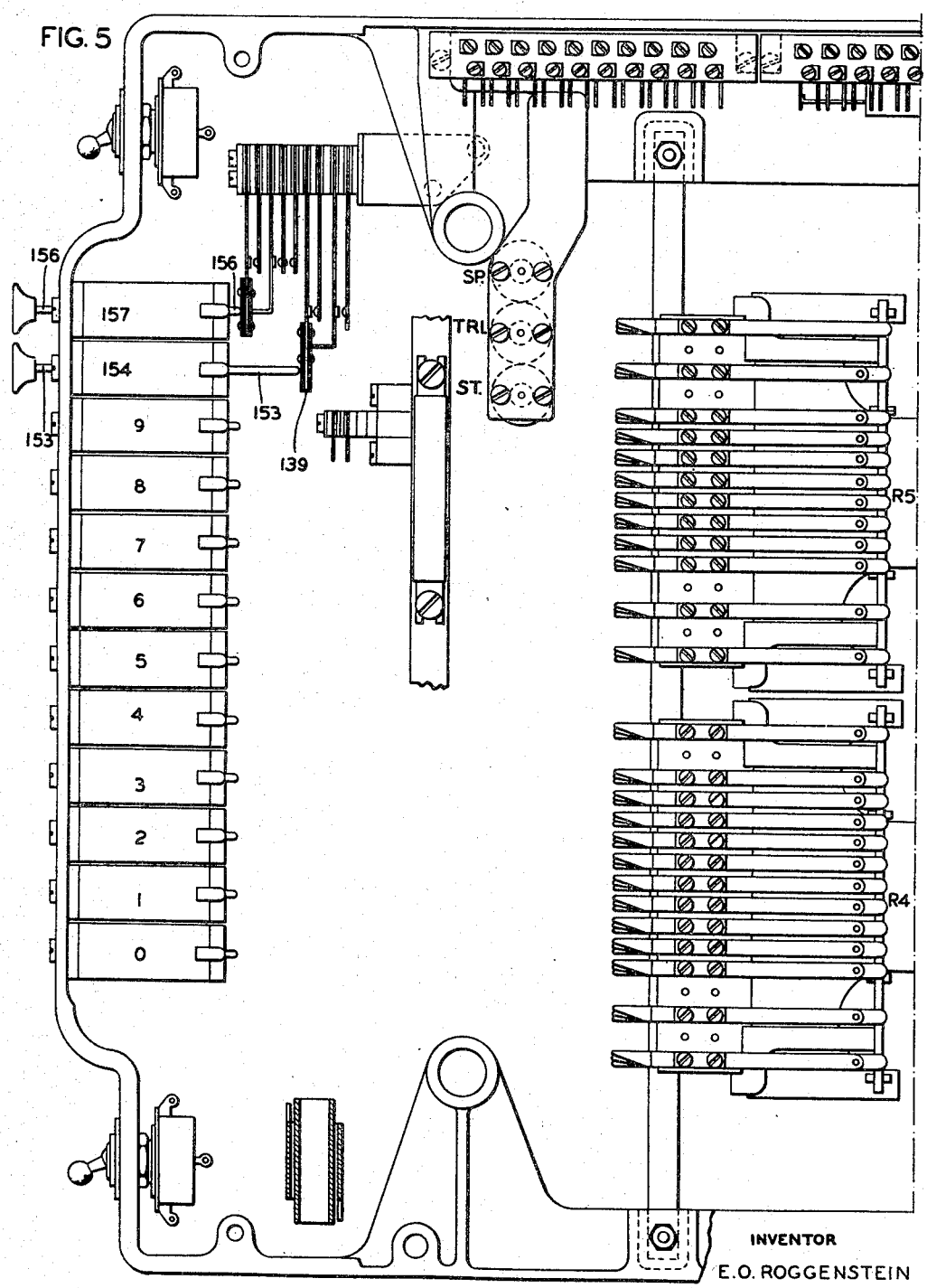

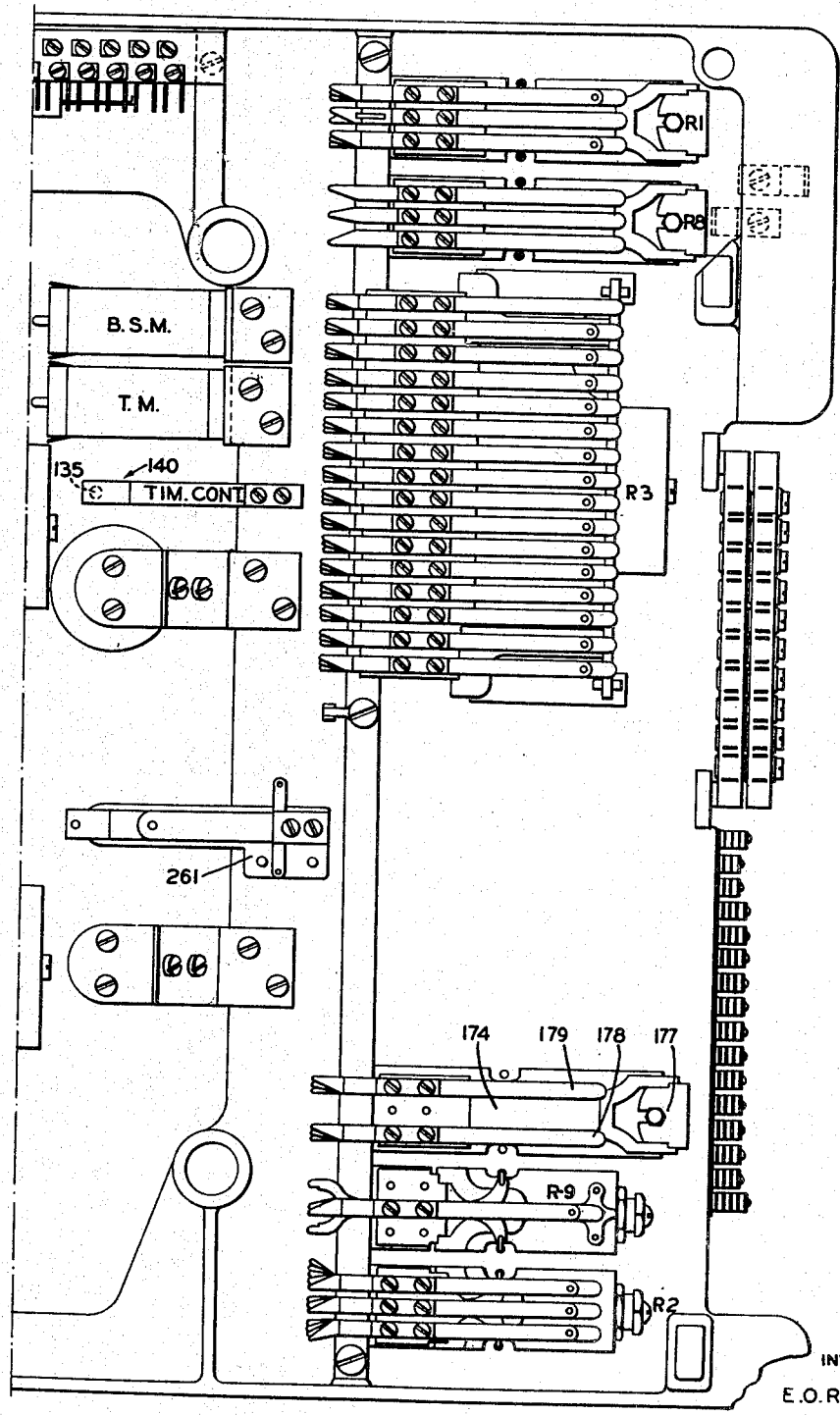

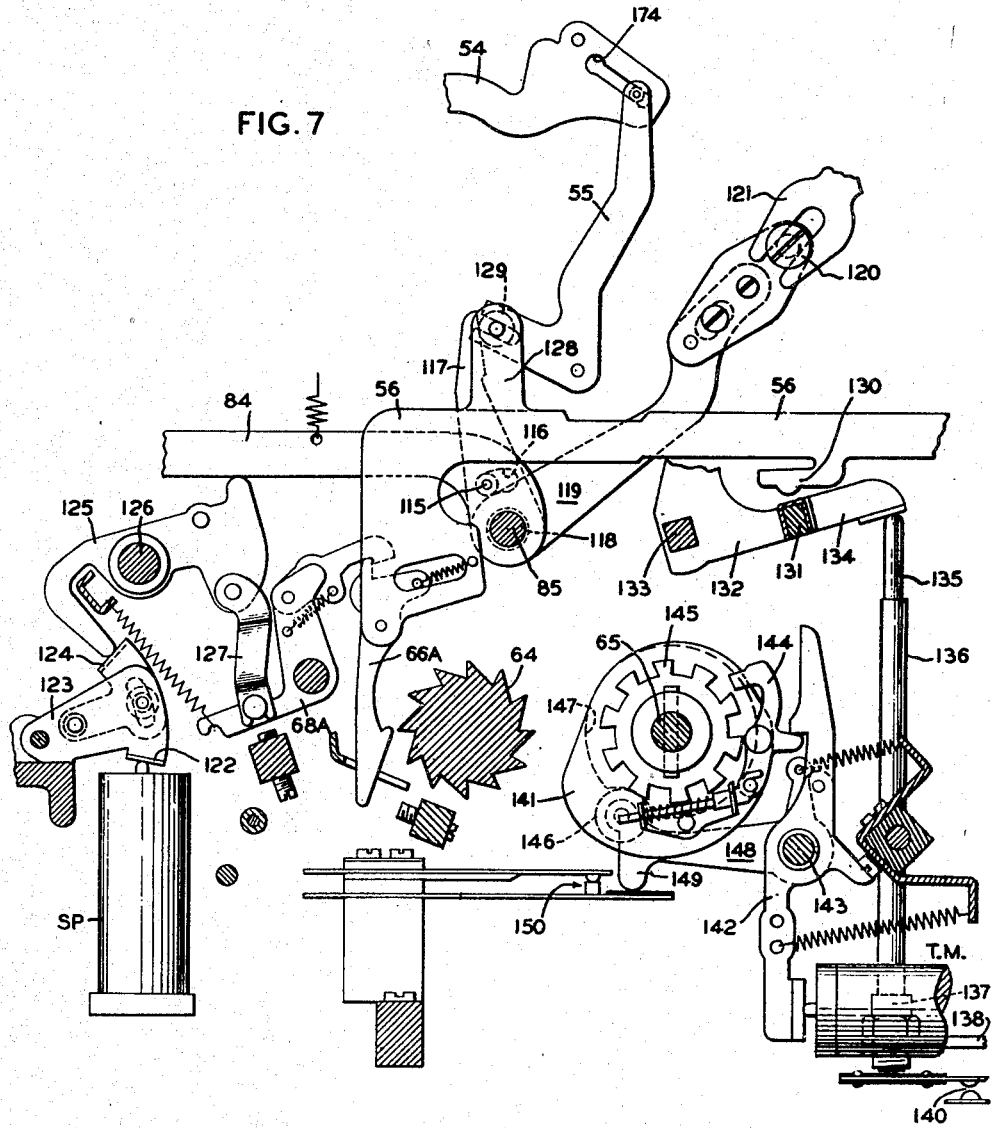

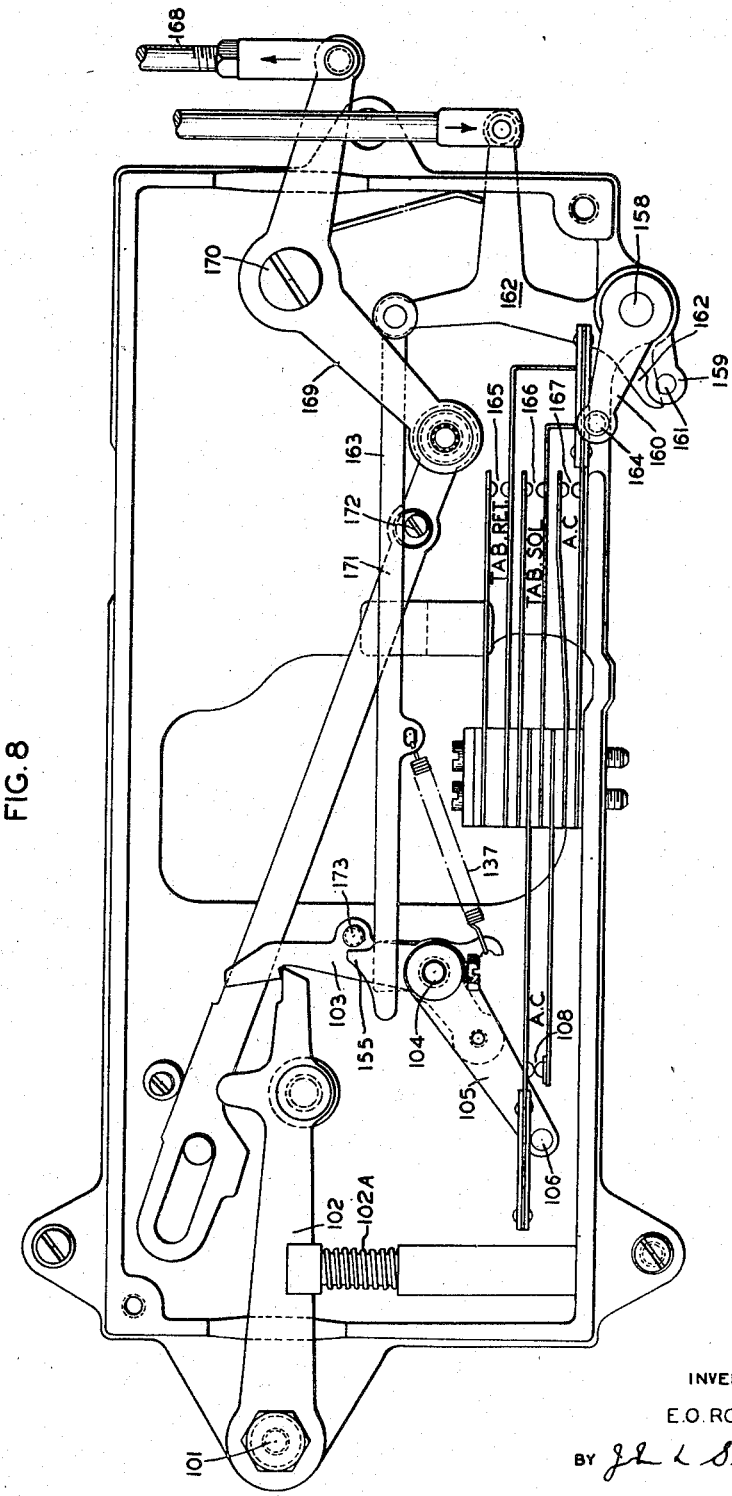

Aug. 8, 1950
E. O. ROGGENSTEIN
2,518,376
ELECTRICALLY OPERATED PRINTING MECHANISM
FOR RECORDING AND COMPUTING MACHINES
Original Filed Oct. 18, 1941
15 Sheets-Sheet 9
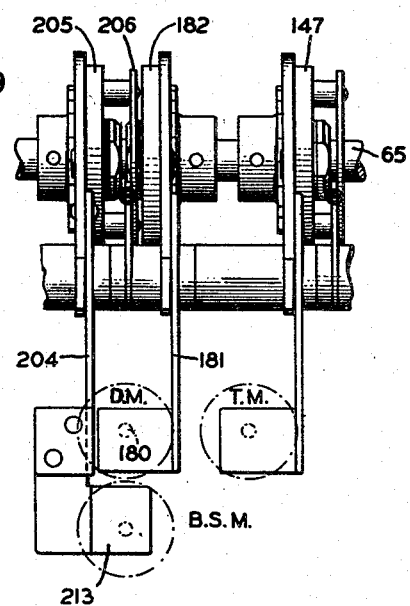
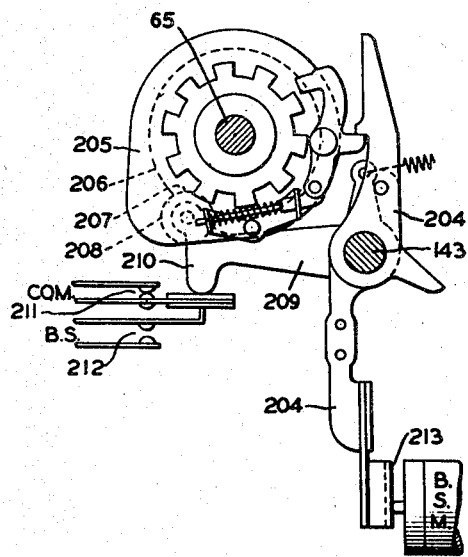
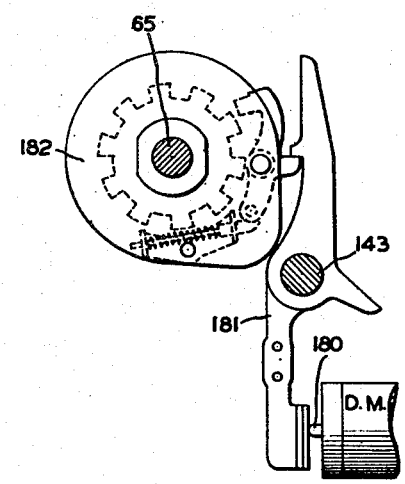
INVENTOR
E. O. ROGGENSTEIN
BY John L. Sterling
ATTORNEY

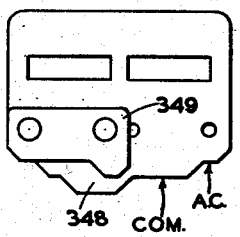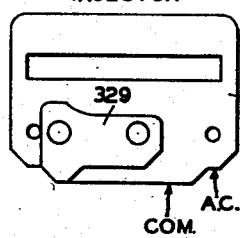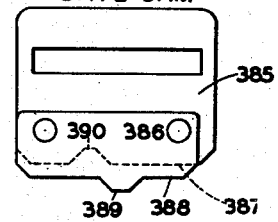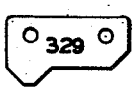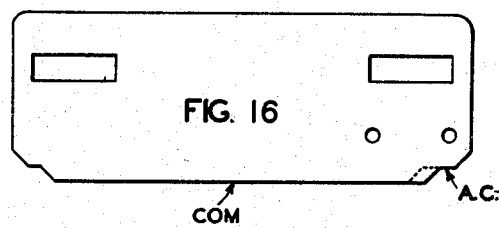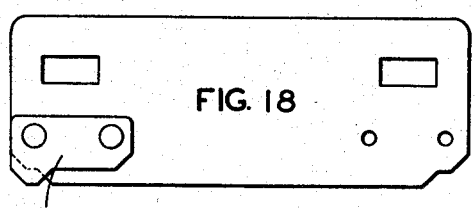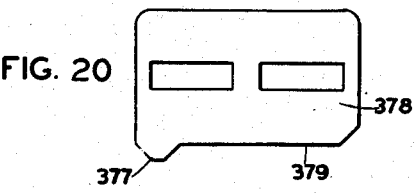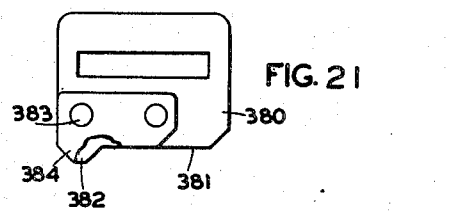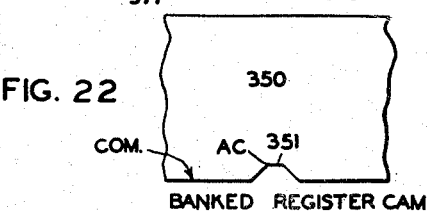

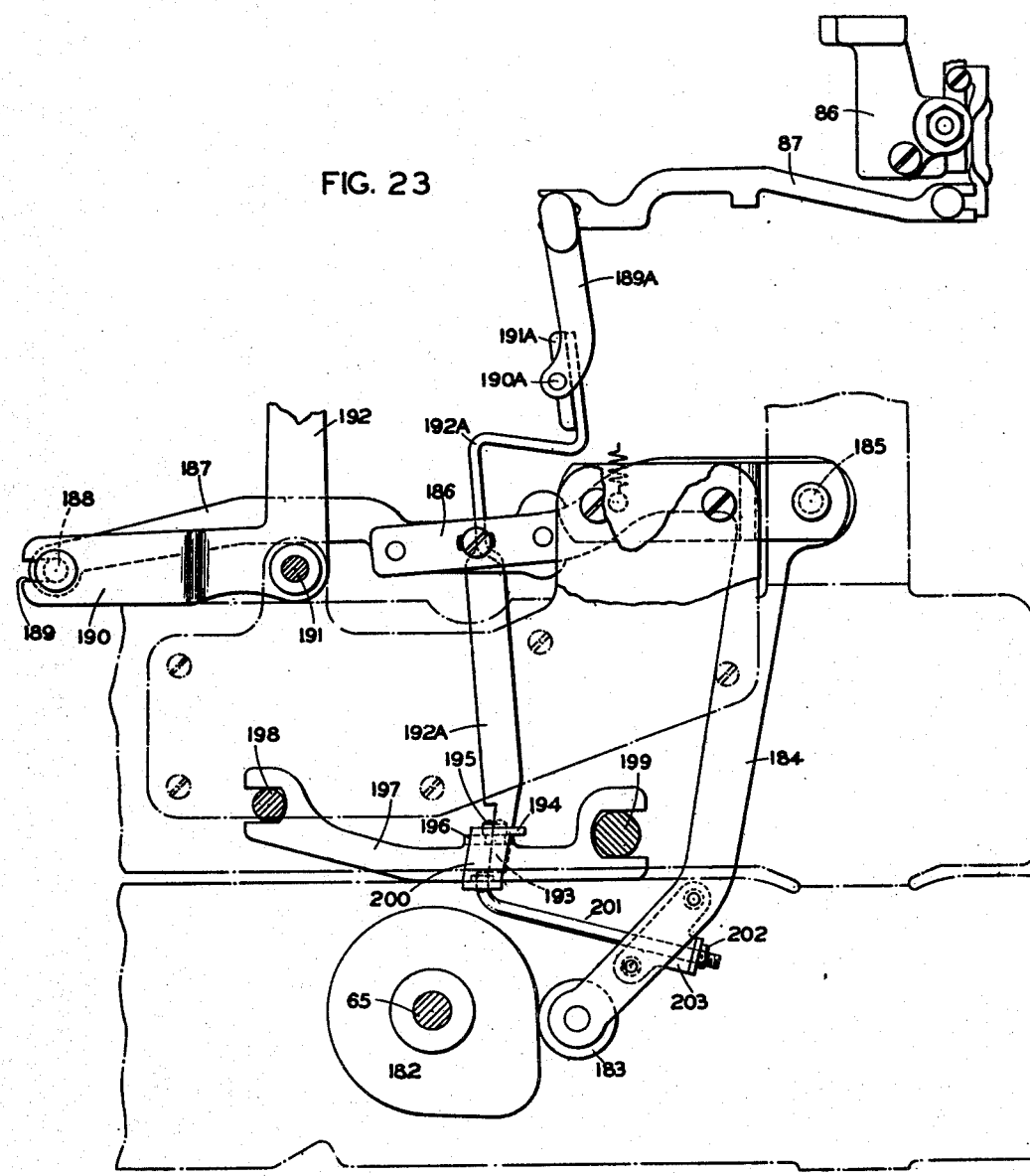

Aug. 8, 1950     E. O. ROGGENSTEIN     2,518,376
ELECTRICALLY OPERATED PRINTING MECHANISM
FOR RECORDING AND COMPUTING MACHINES
Original Filed Oct. 18, 1941     15 Sheets-Sheet 12

INVENTOR
E. O. ROGGENSTEIN
BY John L. Sterling
ATTORNEY

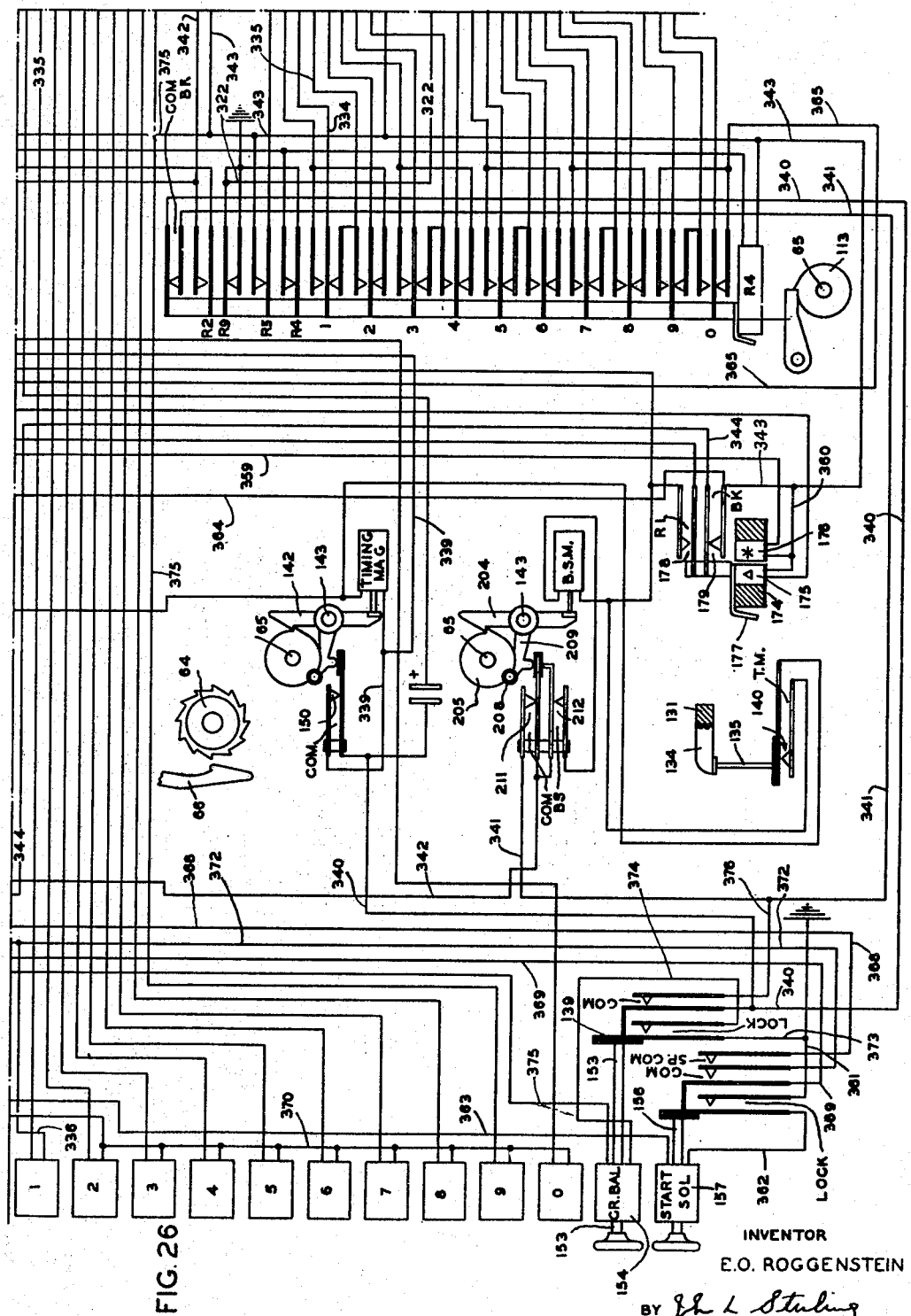

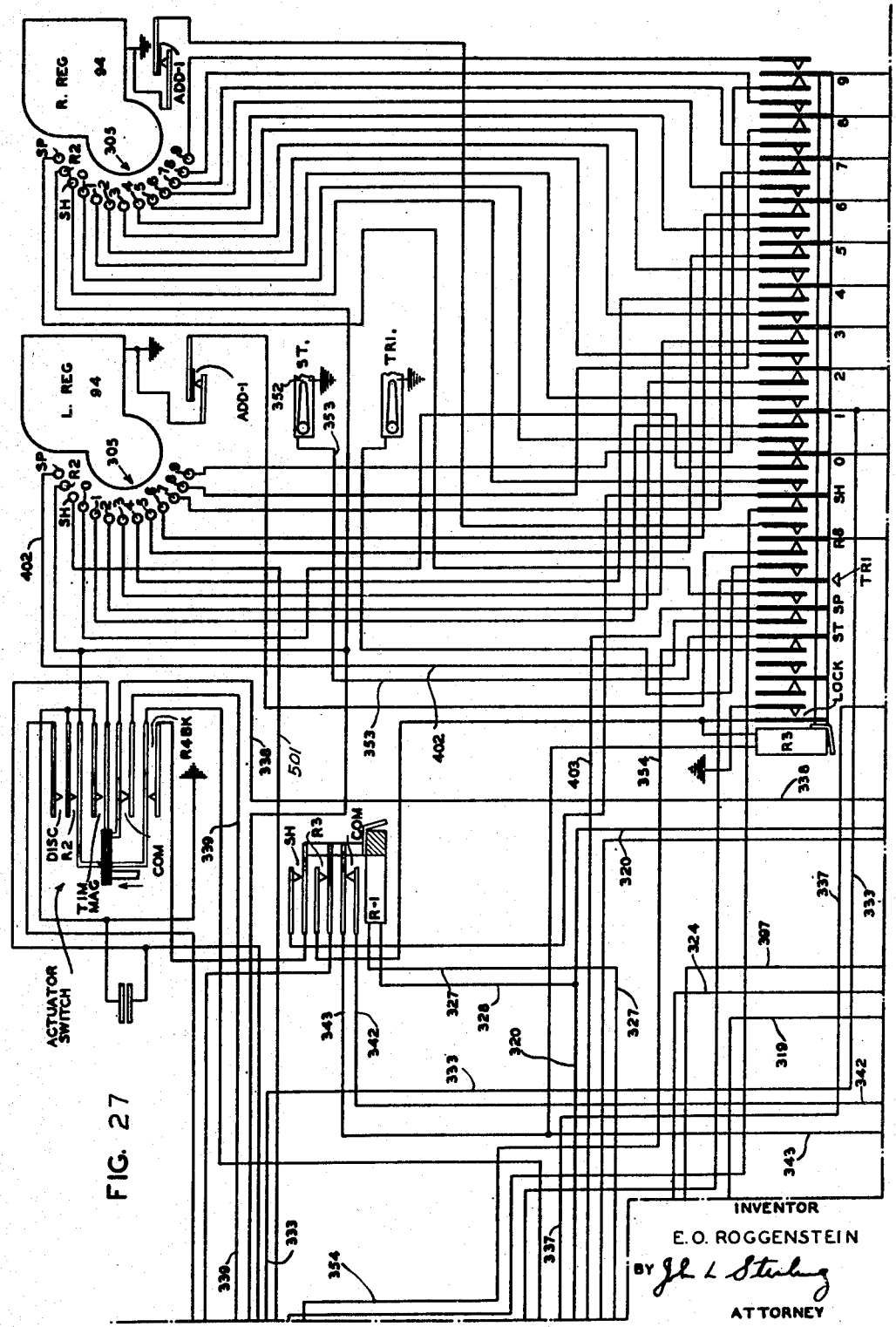

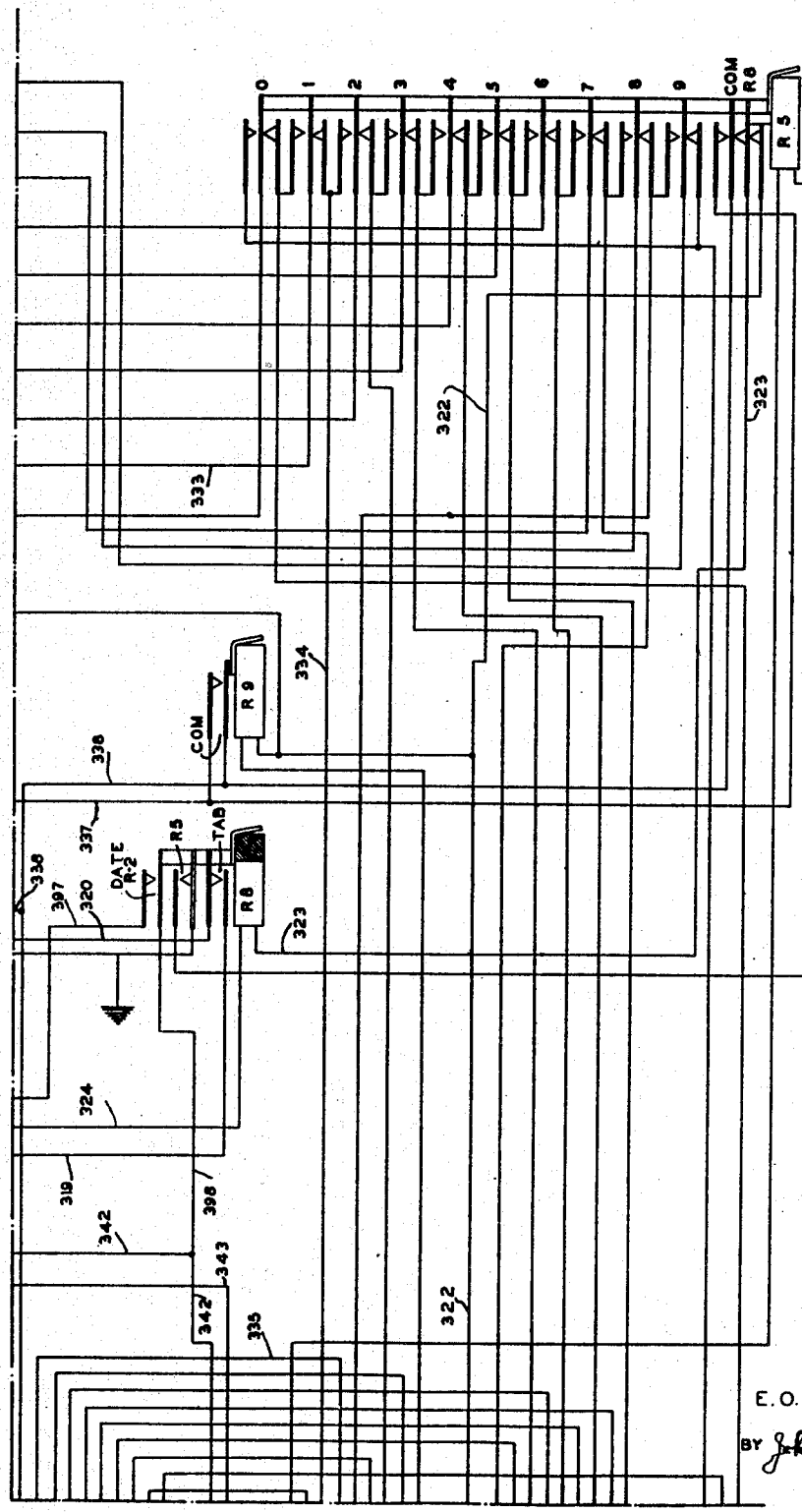

Patented Aug. 8, 1950

2,518,376

UNITED STATES PATENT OFFICE 2,518,376

ELECTRICALLY OPERATED PRINTING MECHANISM FOR RECORDING AND COMPUTING MACHINES

Edwin O. Roggenstein, Ilion, N. Y., assignor to Remington Rand, Inc., Buffalo, N. Y., a corporation of Delaware Original application October 18, 1941, Serial No. 415,564. Divided and this application June 8, 1944, Serial No. 539,254

10 Claims. (Cl. 197—13)

This invention relates to new and useful improvements in recording and computing machines and is particularly presented as an improvement over the machines shown and described in my copending applications S. N. 369,399, filed December 10, 1940, now Patent No. 2,412,537, issued December 10, 1946, and entitled "Recording and Computing Machines," and S. N. 236,854, filed October 25, 1938, now Patent No. 2,364,758, issued December 12, 1944, and entitled "Recording and Computing Machines."

This application is a division of my copending application S. N. 415,564, filed October 18, 1941, now Patent No. 2,364,759, issued December 12, 1944, and entitled "Recording and Computing Machines."

An object of the invention is to provide simple mechanism whereby the machine can be spaced without tabulation when totalizers are disposed closely adjacent each other.

A further object is to provide simple means whereby the machine will automatically lock when ready automatically to print a negative balance and can only print such a balance after the operator has pressed a button.

A still further object is to provide simple means whereby the carriage can be skipped to a selected distribution column for automatic printing and will not print there until a button is pressed.

Yet a further object is to provide automatic date printing apparatus which will cause the date to be printed in any column without repetition in that column and will then automatically space to the next position.

A further object is to provide means whereby the carriage can be automatically returned to an intermediate position and tabulated automatically from that point to a desired column.

A further object is to provide an improved mechanism whereby in any column a check number may be printed and a number one added to the appropriate register for consecutive check numbering.

A still further object is to automatically obtain a clear symbol from either cross register if the same has been manually cleared, lacking which the machine locks.

Yet another object is to improve and simplify the operation of the timing cam when the space, the star, or the triangle magnets are energized.

A feature of the invention includes a special cam on the rack bar cooperating with a double wound relay disposed in a circuit parallel to the star and triangle magnet operating circuit, said relay being a slow release relay, and adapted to control certain circuits whereby a star or triangle may be printed an the carriage spaced from one register position to another without tabulation where the registers are placed closely side by side.

A still further feature includes a special solenoid arranged to control a common supply circuit in parallel with a normally closed common circuit controlled by the credit balance relay. When this relay is energized its common supply is opened and the machine will lock up until the common circuit controlled by the special solenoid is closed. This is effected by pressing a button connected to the plunger of said solenoid.

Yet another feature includes another special solenoid arranged to control a common circuit in parallel with the main common control switch on the tabulator head. A special cam with a double width A. C. or power level at the front end is employed. The machine is skipped to a selected distribution column where it stops in the first position of the A. C. level of the cam. When the skip key is released the tabulator switch is released which opens the starting relay RI circuit and closes the A. C. circuit. When the slow release starting relay RI is deenergized its common contact is closed but, since the machine is still on the A. C. level of the control cam, the main common control switch is open and the machine will not print. However, by closing the special starting solenoid the parallel common is closed and printing begins. As soon as the machine reaches the higher common level of the special cam a starting solenoid rear control switch is opened to deenergize the starting solenoid and restore its contacts to normal.

Still a further feature includes a special date control cam selectively actuating rear control switches to release the date printing cam. This cam mechanism is provided with mechanical means to rock the escapement lever so that as soon as the date is printed the carriage is advanced one space to open the A. C. power contact so that it is impossible to repeat printing of the date.

Another feature has to do with returning the carriage to an intermediate position from which automatic printing can take place and includes a special intermediate stop switch disposed in relation to and operated by the intermediate carriage return mechanism. An A. C. contact on this switch is in series with the regular A. C. switch operated by the carriage return and they are so related in their operation that as soon as the main carriage return switch is closed, as the carriage comes to a stop, the automatic tabulator mechanism is activated to tabulate the machine to the desired printing position, if the carriage return lever is held in depressed position.

A further feature of the invention includes a special control cam on the tabulator rack to operate certain switches to energize the #1 magnet over a circuit normally employed to print a triangle and to open the circuits of all the other printing magnets. This operation is for the purpose of entering a "one" into a register in connection with the numbering of checks.

Still a further feature concerns special cams for either the right or left register to print a triangle or a star when the register has been manually cleared and print an automatic proof symbol. These cams are adapted to operate certain control switches, whereby, in desired columns to which the carriage is tabulated, the operator manually prints a total and if this is correct the register will be cleared and a star or triangle will be automatically printed. This involves also modifying certain contacts on the starting relay R1 and the zero-space relay R2.

Another feature has to do with the operation of the timing magnet which, when energized, releases the timing cam. Heretofore as described in Patent No. 2,412,537, supra, the timing cam was released by the action of a pull-link operated through the intermediary of the snatch roll pawl. The improved construction includes a switch in circuit with the timing cam. This switch is closed by a universal bail, which is moved by the operation of the sub-levers of the space, star, and triangle keys. Therefore, the cam is now released by the action of the magnet instead of the pull-link.

Further detailed features will be apparent from the following description and claims and are all directed to the achievement of a simplified, accurate operation of the related parts which enable a minimum number of magnets, switches, and relays to achieve the maximum of sequential cooperative actions in any desired time relation.

A more clear conception of the operation, construction, and further objects of the invention may be had from the following specification when read in conjunction with the accompanying drawings, in which.

Figure 3:
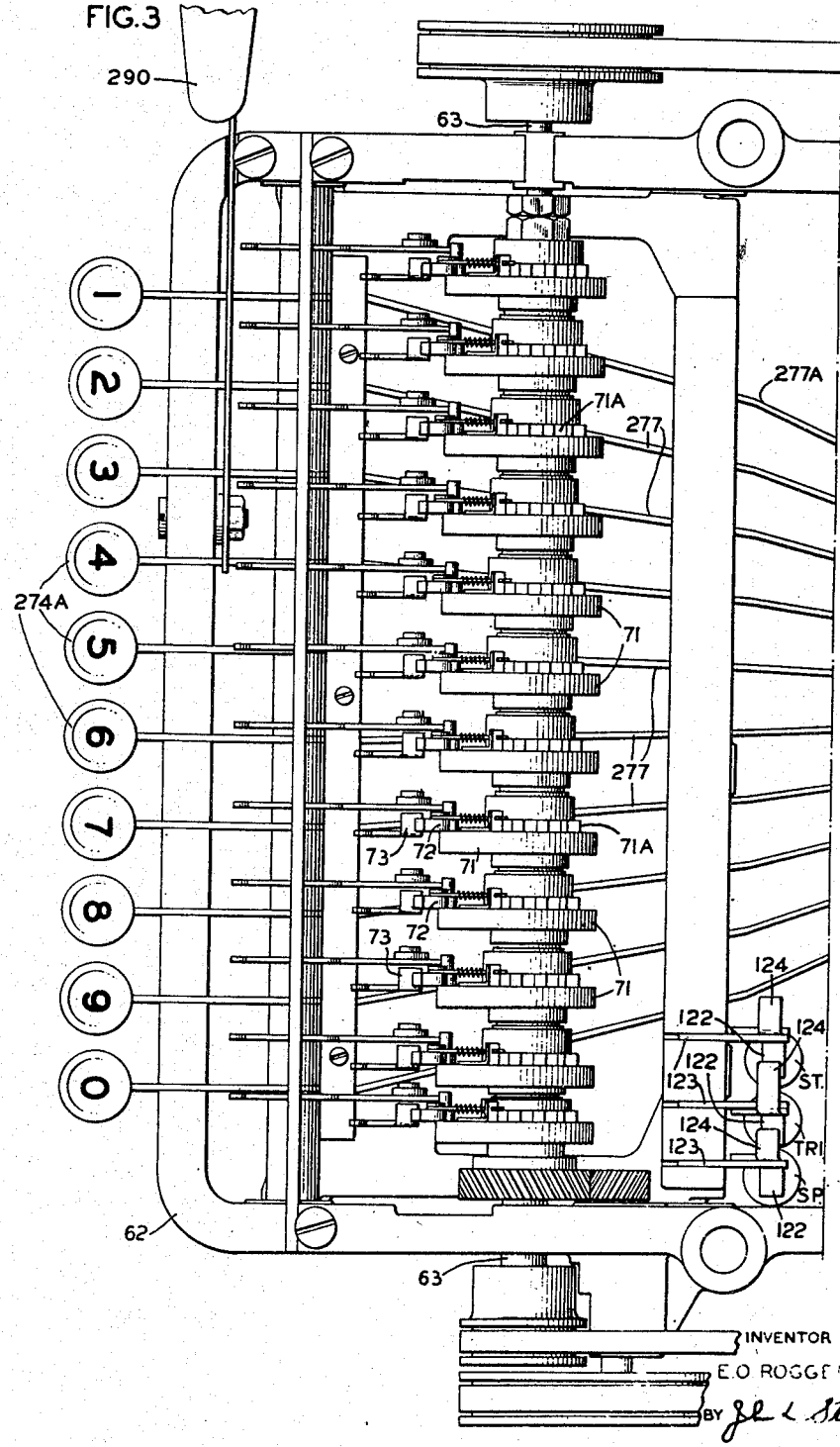
Figure 4:
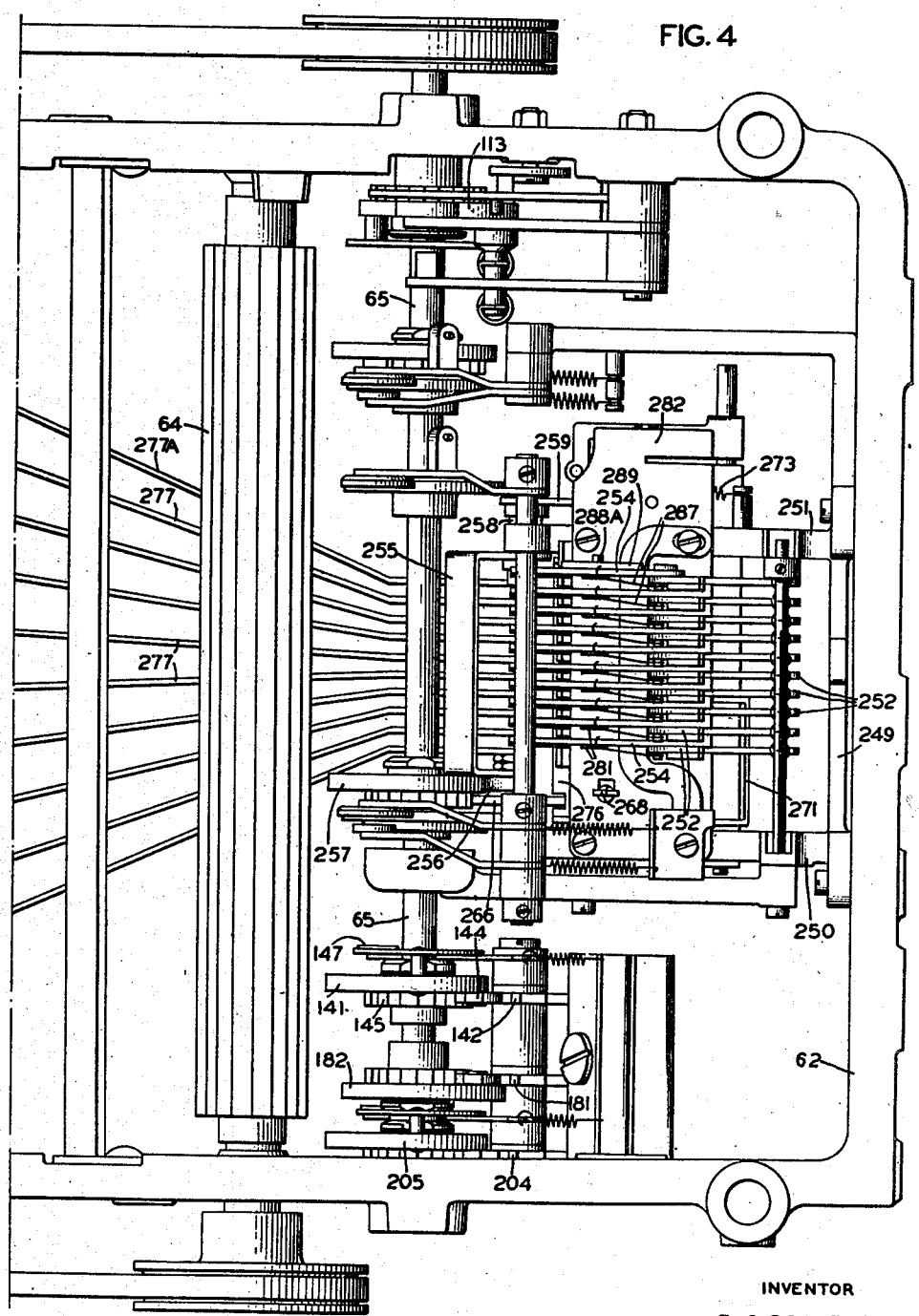
Figure 25:
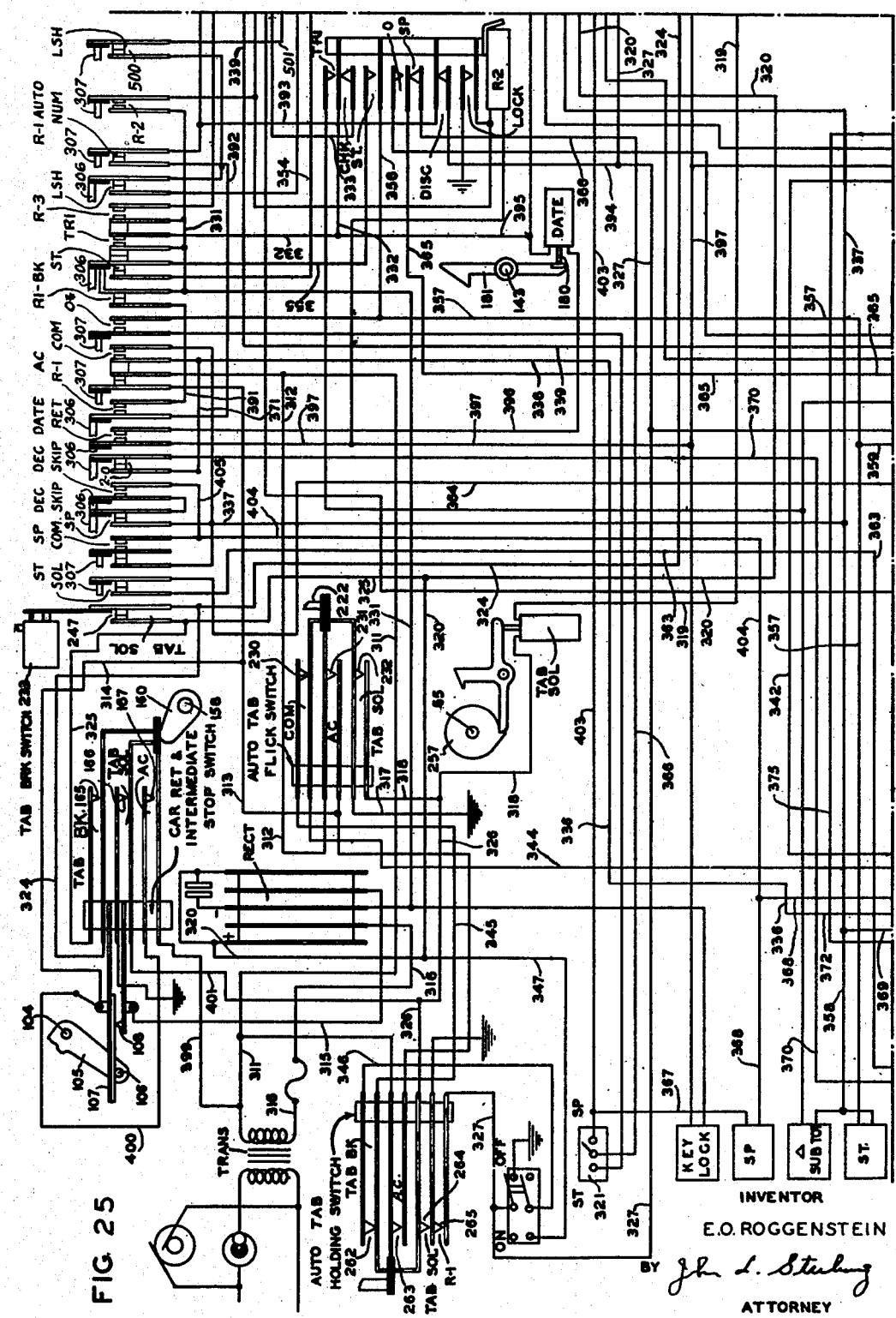

Figs. 3 and 4 taken together represent a substantially complete plan view of the front and rear halves of the power base as seen when the typewriter frame is raised therefrom;

Figs. 5 and 6 taken together represent a substantially complete inverted plan view, respectively, of the front and rear portion of the relay supporting frame disposed against the bottom of the power base shown in Figs. 3 and 4;

Fig. 7 is a partial vertical right-hand sectional view showing the inter-connection between the star, triangle, and space magnets, and the timing cam and timing magnet mechanism;

Fig. 8 is a side elevation of the carriage return control box with the cover removed showing the A. C. carriage return switch and the intermediate stop switch;

Fig. 9 is a rear elevation of a portion of the power cam shaft showing the date, back-space, and timing cams and the connections between them and their respective operating magnets;

Fig. 10 is a side elevation of said shaft showing the back-space cam and switch and operative connections to the back-space magnet;

Fig. 11 is a similar view for the date cam and associated magnet;

Fig. 12 is a plan view of an F. C. or decimal space type of register control cam;

Fig. 13 is a plan view of an injector control cam for check numbering;

Fig. 14 is a plan view of a date control cam;

Fig. 15 is a plan view of the upper portion of a symbol and check numbering cam;

Fig. 16 is a plan view of an ordinary left register total cam;

Fig. 17 is a plan view of an ordinary right register total cam;

Fig. 18 is a plan view of an ordinary left register sub-total symbol cam;

Fig. 19 is a plan view of an ordinary right register sub-total symbol cam;

Fig. 20 is a plan view of an automatic proof left register cam;

Fig. 21 is a plan view of an automatic proof right register cam;

Fig. 22 is a plan view of a part of a control cam for banked registers;

Fig. 23 is a side elevation of a portion of the machine showing the mechanism for operating the date print bar and the carriage escapement;

Fig. 24 is an inverted plan view of a portion of the connection between the date cam and the escapement rocker;

Figs. 25-28, inclusive, show the complete circuits of the machine, and as such Fig. 25 represents the upper left portion; Fig. 26 the lower left portion; Fig. 27 the upper right portion; and Fig. 28 the lower right portion, of said circuit when joined together as shown in Fig. 29, and Fig. 29 is a diagram of the layout of Figs. 25-28, inclusive.

*Power operated general typewriter mechanism*

Figure 1:
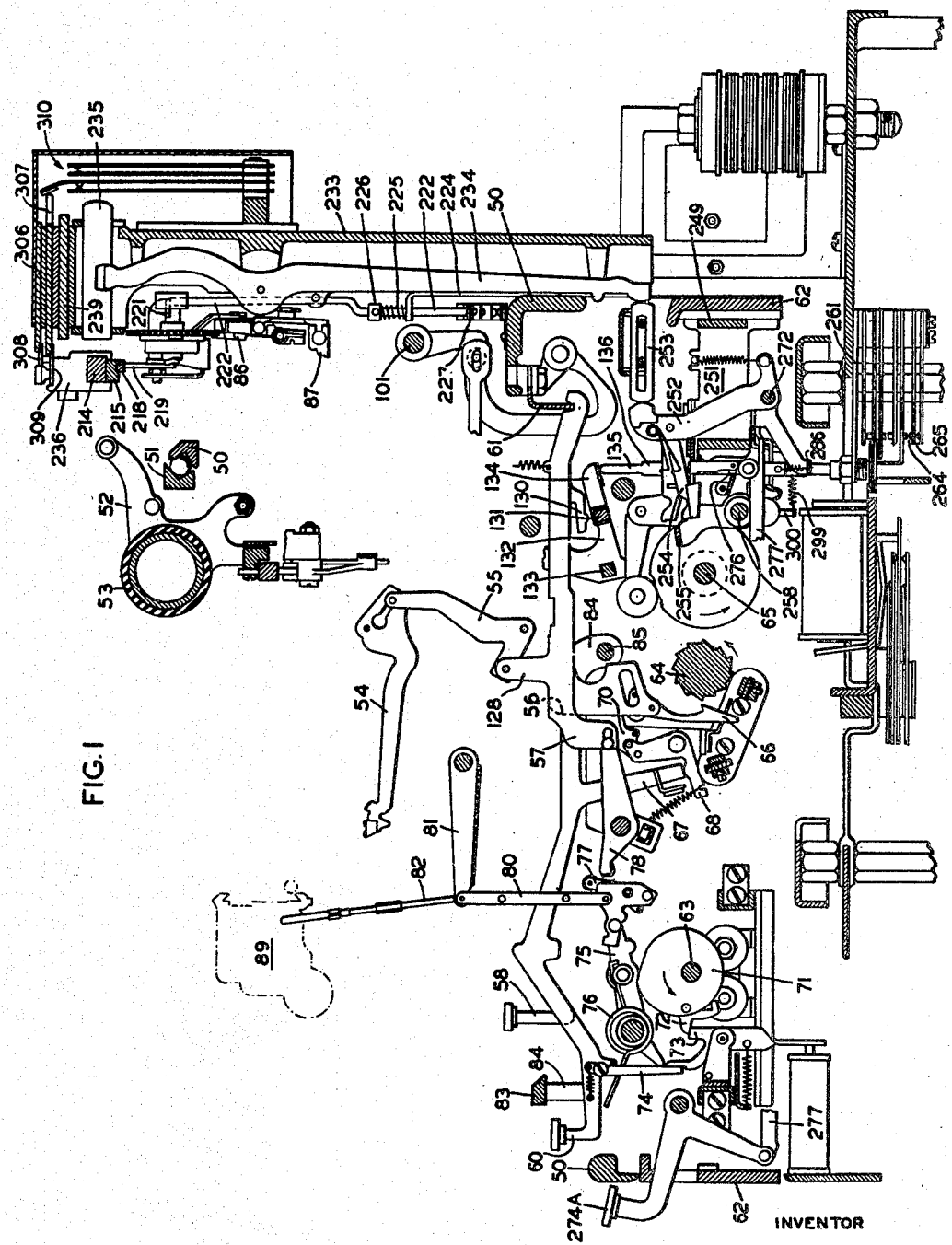
Fig. 1 is a general front to rear vertical sectional view of said machine having the invention embodied therein, the view being on an irregular section with some parts broken away or shown fragmentarily and many parts omitted.

In the drawing the invention is shown applied to an electrified Remington bookkeeping machine. The ordinary Remington electrified bookkeeping machine is well known in the art and has been described in a series of patents, and only so much of the machine is shown in the present drawings as is necessary to an understanding of the invention and its application thereto. Said machine includes a Remington typewriter, fragments of the frame 50 of which are shown in Fig. 1 of the drawings.

The typewriter carriage 51 supports a platen frame 52 carrying a platen 53. The type bars 54 are operated by type bar bell-cranks 55. The bell-cranks which operate alphabetical type bars are operated by levers 56 and those that operate numerical type bars are operated by levers 57, which, together with the alphabetical key levers 58 and the numerical key levers 60 are all pivoted on an angle bar 61 at the rear of the machine. All of these type bars are operated by a power drive, located in a base section of the frame 62 on which the typewriter frame is mounted. This power drive includes three continuously rotating shafts, namely, a shaft 63 for operating the computing mechanism and the numerical type bars, a snatch roll 64 for operating the alphabetic and other character type bars, and a rear power shaft 65 which operates the various cams which when released effect such operations as tabulation, case shifting, key-lock, timing, back-spacing and date printing. These three shafts are driven counter-clockwise (see Fig. 1), by any suitable means such as a motor, as shown in the patent to Dodge et al., 2,064,154, issued December 15, 1936.

Each of the alphabetic type bar operating levers 56 has a hook 66 pivoted thereto and hanging down in front of the snatch roll 64. Each of the alphabetic key levers 58 has a dependent arm 67, adapted to rock a bell-crank 68 carrying a hook 70 engaging the upper arm of the hook 66 in such fashion that, when the key lever is depressed, the hook 66 is swung into engagement with the snatch roll, which depresses the lever 56 and operates the type bar.

On the shaft 63 there is a series of cams 71, one for each numeral key. Said cams are loose on the shaft and each is controlled by a clutch, the dog 72 of which is shown in Fig. 1, said dog being adapted for engagement with a toothed wheel 71A (Fig. 3) fast on the shaft. This dog is controlled by a latch 73 adapted to be tripped by a pusher 74, pivoted to the associated key lever 60 with the result that the dog 72 engages the toothed wheel and drives the cam 71 for a single revolution at the end of which it is arrested by the dog 72 again striking the latch 73. Each cam 71 controls a follower lever 75 urged downward by a strong spring 76. The shape of the cam is such that, when it rotates this lever first moves downward and then up to its normal position. The lever 75 carries a pivoted pawl member 77, which when the lever is at the bottom of its stroke, snaps in under the front end of a lever 78, which at its rear end is articulated by a pin and slot with one of the levers 57. On the upstroke of the lever 75, pawl 77 rocks the lever 78 which, in turn, rocks the lever 57 and operates the numerical type bars 54.

Each lever 75 has pivoted thereto a link 80, which is pivotally connected to a lever 81, which, in turn, has pivoted thereon a pull rod 82, which operates the computing mechanism. All of this mechanism is well known and disclosed and described in the above mentioned Roggenstein Patent No. 2,364,758.

The Remington machine also includes a space bar 83, whose bail arm 84 (Fig. 1) is mounted on a shaft 85 which is adapted to operate the dog rocker 86 of the typewriter escapement through a link 87 as described in the above application. Further detailed means for operating this dog rocker 86 by energization of the date magnet will be described later. The link 87 is also arranged to be operated in the usual manner by a universal bar which is actuated by the heel of each of the type bars 54 in the well known manner.

The computing mechanism involved herein, except as otherwise described, is of the sort that has long been used in the Remington machine and which is described in a line of patents, which in a way may be said to begin with that to Wahl 1,270,471, dated June 25, 1918. The differential and control mechanism of this computer is mostly mounted on a casting 88 (Fig. 2), which casting is secured to the front top plate of the typewriter. Vertical totalizers or "dummies" 89 may be mounted at desired points on a main truck 90, guided at the middle of the machine by rollers (not shown) and connected with the typewriter carriage 51 by means of a casting 91 having pin and slot connections with brackets 92 at the ends of the truck 90. The machine also includes cross footing mechanism including a cross truck 93 carrying a cross totalizer 94 and controlled by the vertical totalizers 89, one after another through the intermediary of a pick-up beam 95. At the end of each column computation, the cross truck 93 is freed from the vertical totalizer and is drawn back by a spring (not shown) to its initial right-hand position.

Totalizers

The pull rods 82 (Fig. 1) operate the usual mechanism of the type set forth in the Wahl patent supra and in Patent No. 2,412,537, supra, in which latter see Figs. 35 and 36. The effect of this mechanism is to add to or subtract items from the vertical totalizers 89 and these operations are transmitted to the cross totalizers 94. The vertical totalizers may be reversed for subtraction by means of the usual hand lever (not shown). The cross totalizers may be reversed for subtraction by the usual means including a follower roller 96 (Fig. 2) mounted on an arm 97 fast on a rock shaft 98 and operating the usual reversing mechanism. The follower roller 96 is under the control of cams 99, on each of the vertical totalizers 89, and each cam is settable to an upper position where it does not depress the roller but leaves the cross totalizer mechanism set for addition, as in the left-hand one of the four totalizers shown in Fig. 2; or to an intermediate position as in the third totalizer from the left, where the cross totalizer is disconnected, leaving it inoperative; or to a lowest position shown on the second and fourth totalizers where the roller 96 is depresed to its fullest extent and sets the cross totalizer for subtraction.

Carriage return

The typewriting machine includes a power driven carriage return mechanism. The return of the carriage is controlled by means of the type shown in Hart Patent 1,567,590, issued December 29, 1925, and in this control mechanism there is a rock shaft 101 which at its left end (Fig. 8) is controlled through an arm 102 by mechanism which is well known and will be described in more detail later. Suffice it to say that at the end of a line of writing, the arm 102 is released and moved upward by a spring 102A causing rocking of shaft 101 which results in the engagement of certain power mechanism with the carriage 51 to return the same as described in the above mentioned patent. This mechanism is not further described in detail here but the arm 102 is released by a latch 103 the operation of which will later be described. The latch 103 is fixed to a shaft 104 to which is also fixed an arm 105 having a stud 106 thereon lying just beneath the end of a contact 108 which is in the electrical circuit of the machine as will be described later. This circuit is the power circuit for all the magnets and relays of the machine, the opening of which by the rocking of main shaft 101 prevents their operation during carriage return.

Power operated shift and reverse mechanism

In the manner described in detail in Patent No. 2,412,537, supra, the type case can be shifted and the totalizers reversed by the operation of the credit balance key 110 and the shift key 111 (Fig. 2) which operation results in the upward movement of a rod 112 to achieve the reversal of the computing mechanism. The shift is effected by the depression of key 111 to manually trip the latch on the shift cam 113 (Fig. 4) or this cam can be released by energization of the shift magnet R4 in the manner set forth in the application, supra. As in the previous application the case is shifted to print negative totals in distinctive type. The shift lock key 114 is of the same construction as heretofore used in the Remington machine and is described in detail in the above Patent No. 2,412,537.

*Space, star, and triangle magnets and timing switch*

In Fig. 7 is shown a mechanism whereby the escapement is operated whenever the space mechanism is actuated either manually or automatically and whereby the timing contact is actuated whenever either the space, star, or triangle magnets are energized. In this figure the space lever 84, operated by the space bar 83, is pivoted loosely on shaft 85 and has a pin or stud 115 adapted to act in a slot 116 in an arm 117 fixed on a sleeve 118 which is rotatable on shaft 85. An arm 119 is fixed to sleeve 118 and has a pin 120 adapted to ride in a fork on a pivoted arm 121 which is connected in any suitable manner to link 87 (Fig. 1) which is connected to the escapement rocker element 86. When lever 84 is operated by depression of the space bar 83, the arm 119 is rocked to effect operation of the escapement rocker.

There are three magnets such as the star, triangle, and space magnets shown in Figs. 3, 5, and 7, and lettered respectively, ST, TRI, and SP. In Fig. 7, the view is taken in a plane to show the space magnet SP and its cooperating mechanism, but it is to be understood that the triangle and star magnets are disposed adjacent thereto and have similar cooperating members, except in minor details, which will be hereinafter explained. The space magnet SP when energized is adapted to thrust upward on a lip 122 of an adjustable interponent 123 which has another lip 124 adapted to engage and rock a bell-crank 125 loosely pivoted on a shaft 126 in a clockwise direction. The other arm of bell-crank 125 is connected by a link 127 to a bell-crank 68A which in operation is identical with previously described bell-crank 68 and is adapted to swing a hook 66A into contact with the snatch roll 64 whereby the space operating lever 56 is depressed in the usual manner. The lever 56 is provided with an upstanding lug 128 having a roller 129 thereon, adapted to engage the upper end of arm 117 so that when the lever 56 is depressed this arm 117 is swung counter-clockwise to actuate arm 119 to operate the escapement mechanism. When the triangle and star magnets TRI and ST are energized the same operation takes place except that the levers 56 connected therewith have no rollers 129 but their upstanding lugs 128 are connected to links 55 and type bars 54 which when operated effect the operation of the escapement through their heels in the usual manner.

In accordance with one feature of my invention, I provide means whereby the depression of any of the levers 56 by the energization of the above three magnets will result in the energization of the timing magnet, TM, and consequently the actuation of the timing switch. To this end these levers 56 are each provided with a dependent member 130 which will engage a bail 131 supported between arms 132 (one shown, Fig. 7) secured on a shaft 133. To this bail 131 is attached an arm 134 which overlies a plunger rod 135 housed in a long sleeve 136 supported at its lower end in a casting 137 which is mounted on a supporting plate 138. The lower end of rod 135 engages a normally open contact 140 and when the plunger 135 is moved down the contact 140 is closed. The contact 140 is suitably supported on the base plate of the machine as shown in Fig. 6. This contact is in circuit with the timing magnet TM and when closed by depression of rod 135 will energize said magnet. The circuit connections will later be described. The timing magnet is adapted to operate a latch 142 pivoted at 143. This latch is adapted to engage a dog 144 related in the manner previously described to a clutch wheel 145 on shaft 65, said dog being mounted on a plate 141. A roller 146 adapted to cooperate with cam 147 is mounted on an arm 148 loosely pivoted on shaft 143. An extrusion 149 on arm 148 is adapted to open a normally closed contact 150 when the timing cam 147 lowers the arm 148. The cam latch 142 is released by energization of the timing magnet TM, the core of which thrusts outwardly against the lower end of the latch 142.

It is, therefore, apparent that the energization of any one of these three magnets above mentioned will cause the operation of the timing cam to open the timing contact 150, upon the printing of the star and triangle, and the spacing of the machine. This mechanism also permits the manual operation of the space bar in the usual manner. It is also apparent that the operation of the timing cam will hold the timing contact 150 open during a full revolution of the cam and thus keep the circuit open until the moving parts of the machine during any operation have plenty of time to come to rest.

*Actuator switch*

In Fig. 27, which is on one of the circuit sheets, is shown an actuator switch which is fully and clearly described in my Patent No. 2,412,537 with especial reference to Figs. 35, 36, and 37 thereof. It is a switch which is operated by the movement of the actuator whenever any significant digit is printed and controls the opening and closing of certain circuits as will be later described in connection with the description of the circuit operation.

*Credit balance switch*

In Figs. 5 and 26 is shown a credit balance switch 139 and solenoid 154. This switch is actuated by pressing the plunger 153 of solenoid 154. As shown in Fig. 26 when the plunger 153 is pressed the inner end actuates certain contacts on switch 139 to close certain circuits as will be later described. This switch is employed in connection with a feature of the invention later described having to do with the automatic stoppage of the machine when it is tabulated to a total printing column and a negative balance is to be printed. When this switch is actuated printing is resumed and the switch is locked up until later released.

*Starting solenoid*

When tabulating to certain selected distribution columns by means of the usual skip tabulator key, a special control cam is used, as will later be described, to cause the machine to stop when this column is reached and not to print until the starting button is pressed. This device is also shown in Figs. 5 and 26 and is similar to the above described credit balance switch. The plunger 156 is the core of a solenoid 157. It is locked up when actuated and later unlocked and actuates certain contacts as will be later described.

Intermediate stop switch

This switch is shown in Figs. 8 and 25 and has to do with the control of the circuit operations during carriage return to an intermediate position and tabulation from that position automatically to a selected column. It is especially useful when it is desired not to return the carriage to its full extent but to start automatic printing again at an intermediate column. The mechanical structure and operation of this switch will now be described leaving its operation in controlling the electrical circuits to be described in connection with the general circuit description and operation. The intermediate stop and carriage return mechanism employed is of the type and structure shown in U. S. patent to W. L. Peters, No. 2,023,543, issued December 10, 1935. The improvement herein involved concerns the relative sequential operation of two switches by this mechanism to automatically tabulate to a designated column after the carriage has reached the intermediate stop position.

When returning the carriage to the intermediate stop, which has been set in the desired position, the operator releases the carriage return mechanism by means of depressing the carriage return lever (not shown) at the right-hand side of the machine, which is adapted to rotate shaft 158 to which is fastened a small assembly consisting of two arms 159 and 160. A pin 161 on arm 159 rotates bell-crank 162 clockwise pulling link 163 to pull back latch 103 by means of hook 155, thus opening the master control A. C. switch contact 108 (by means of arm 105 and pin 106) before pin 164 on arm 160 closes the intermediate switch which has contacts 165, 166, and 167. According to the circuit, the contact 108 is in series with the contact 167 whereby, as later described, no current can be supplied to the rectifier until both these contacts are closed.

When the carriage hits the intermediate stop element (not shown) restore rod 168 is pulled in the direction indicated by the arrow, rotating bell-crank 169 pivoted on stud 170. A link 171 connected to bell-crank 169 is pulled down so that link 163 resting on an adjustable stud 172, on link 171, will be drawn down by spring 137, lowering hook 155 away from pin 173 on latch 103, allowing the latch to snap back to normal and lower pin 106, thus permitting A. C. contact 108 to close.

Special double coil relay

This is illustrated in Figs. 6 and 26 in which latter is shown somewhat schematically. This relay is in circuit, in a manner to be later explained, in detail, with the star and triangle symbol magnets and is employed for the purpose of not only printing symbols and balances but also to space between registers which are banked closely adjacent each other. As shown, the relay 174 is a special slow release type with two coils 175 and 176, the first associated in circuit with the triangle magnet and the second in circuit with the star magnet. The inner ends of the coils are connected. The relay armature 177 controls a contact 178 which is normally open and a contact 179 which is normally closed.

Date printing mechanism

This mechanism is shown in Figs. 4, 9, 10, 11, 23, 24 and 25. The actual mechanical construction and operation will be described, leaving its relation to the electrical circuits and the date control cam to be described in the proper portion of the description of the circuit and its operation. The purpose of this mechanism is to enable a date to be printed automatically in any desired column. As seen in Figs. 9 and 11, the date magnet DM is supported in any suitable manner immediately above the back space magnet BSM. Its armature 180 actuates a latch 181 to release the date cam 182. In its general aspect the construction is similar to that shown in a U. S. patent to Hart No. 1,952,983, issued March 27, 1934. Certain changes have been made which when combined with circuit operation and control, constitute a feature of this invention. As shown in Fig. 23 as the cam 182 is released to rotate it engages a roller 183 on bell-crank 184 pivoted on a stud 185. This bell-crank is connected by its horizontal arm 186 to an extension link 187 having on its outer end a pin 188 disposed in a slot 189 of a bell-crank 190 pivoted at 191, the vertical arm 192 of which is connected, as clearly shown in Fig. 1 of the Hart patent, supra, to the date printing arm to operate the same. Immediately after the date has been printed, it is desired that the carriage be moved one space and to this end I provide means operated by the movement of the date cam 182 so as to rock the escapement, and space the carriage. This means includes the usual escapement rocker element 86 connected to link 87 which in turn is connected to the universal type-bar 189A which rocks around a pivot 190A. To a central plate 191A on the bar 189A is fastened a dependent link 192A, the lower end 193 of which lies closely adjacent the outer end of an oscillatory lever 194. This lever 194 is pivotally mounted at 195 on a plate 196 fastened to a cross bar 197 which is provided with end slots to engage and be supported by cross rods 198 and 199. The other end of lever 194 is bent down as shown at 200 and to the flat end thereof is fastened one end of a tie rod 201, the other end of which is adjustably connected, in any suitable manner such as by an adjusting nut 202, to a bracket plate 203 fastened to the cam operated bell-crank 184 near its lower end adjacent the date cam 182. It is obvious, therefore, that the oscillation of bell-crank 184 by the cam 182 will oscillate lever 194 to rock link 192A and thereby rock the escapement rocker element 86 to space the carriage. The relative mechanical adjustment of the operating parts may be suitably arranged so that the operations of date printing and carriage escapement may take place in the proper time sequence.

Sensing device

Figure 2:
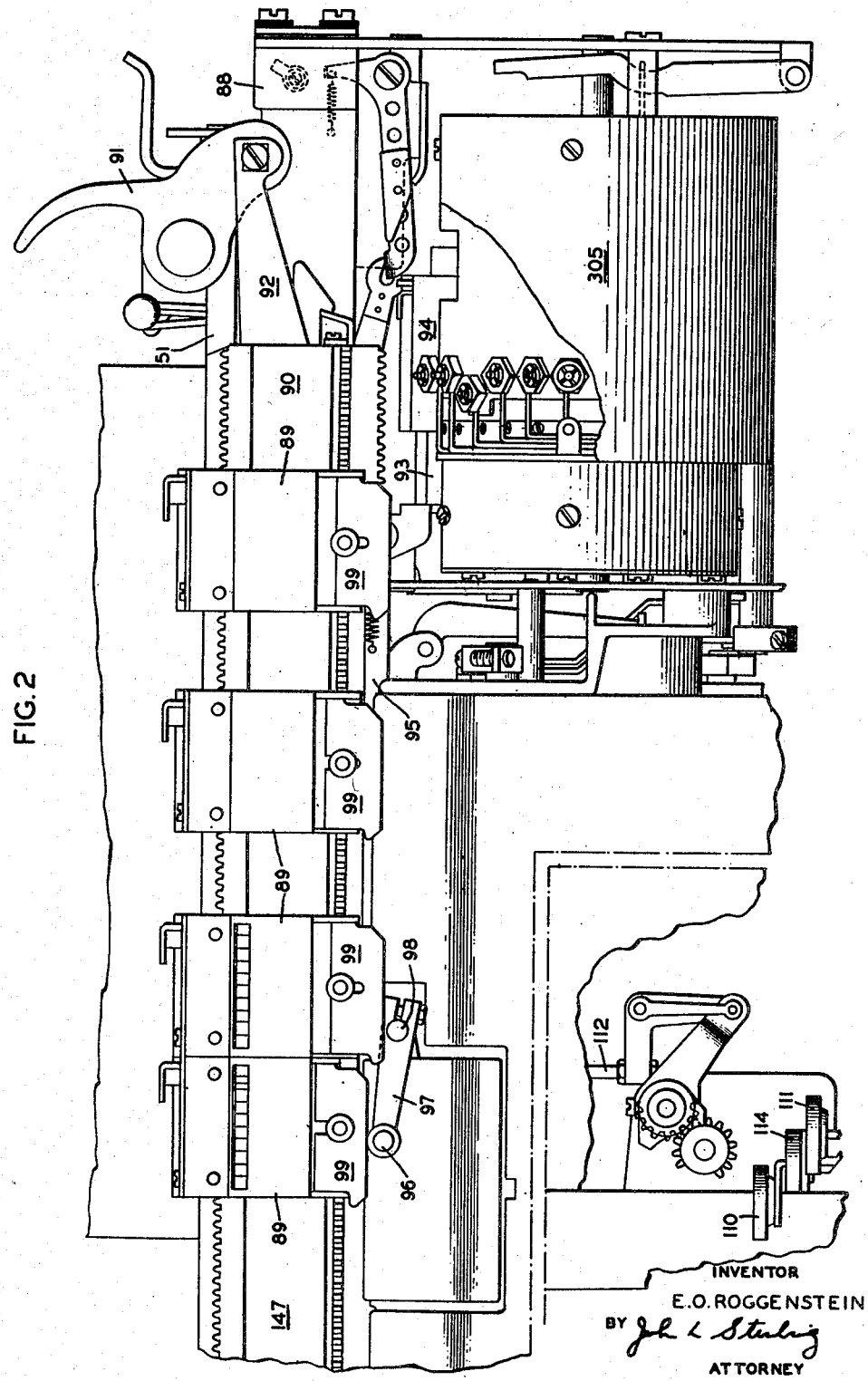
Fig. 2 is a partial front elevation of the machine, showing the vertical totalizers and the sensing unit.

As shown in Figs. 2 and 27 the sensing device is generally designated as 305 and is the same as that shown in my Patent No. 2,412,537 except that in the present device the machine is designed for accounting in terms of American money rather than English money. It forms no part of the present invention and any detail description thereof is not believed necessary. However, generally speaking the usual sensing discs on the cross totalizer 94 are moved across the sensing finger of the sensing device to selectively close circuits through relays and magnets to operate the printing and other magnets.

Control contacts

As shown in Figs. 1 and 23, the tabulator casing 233 at the top thereof and above the stop-slides therein is provided with upper and lower slide plates 306 and 307 having beveled front edges which are adapted to be engaged by upper and lower control cams 308 and 309 mounted on the top of the tabulator stops 236 (Fig. 1) in desired positions along the tabulator rack bar 214 in order to effect certain circuit results which will be described more fully later. These slides open and close selectively a plurality of control contacts which in Fig. 1 are generally and inclusively given the number 310 although later in the description of the circuit operation they may be separately designated in order to set forth their individual function and operation.

Relays

The wiring diagram (Figs. 25, 26, 27, and 28) contains the relays R1, R2, R3, R4, R5, R8, and R9 in addition to relay 174 (already described). All of the relays except relay 174 have generally the same functions and operate substantially in the same manner as already set forth in my Patent No. 2,412,537. Any changes in their operation and any new circuit controls effected by them will be set forth in detail hereinafter.

Check numbering operation

This device includes an injector control cam 330, shown in Fig. 13. To achieve this operation, the triangle control contact TRI (Fig. 25) is employed to impulse the #1 printing magnet. When tabulating to the column of the register in which the automatic "one" is to be injected, this contact TRI is closed by the upper level cam 329 (Fig. 13). This same cam also opens the control contact 2—0 (Fig. 25) so that energization of any numeral magnet other than "one" is prevented. The lower level cam 330 (Fig. 13) closes the A. C. and COM control contacts as usual. The circuit over which the #1 printing magnet is thus energized is as follows: From the middle plate of the rectifier, wire 331 through control contact TRI, wire 332, through contact CHK on relay R2 (now deenergized), wire 333, to the center spring of the #1 contact on relay R5 (now released), wire 334, through the #1 contact on relay R4 (now released), wire 335, through the #1 printing magnet, wire 336, through common control contact COM, wire 337, through common contact COM on relay R9 (now operated), wire 338, through common contact COM on actuator switch, wire 339, through contact 150 at the timing magnet, wire 340, through contact COM BK on relay R4, wire 341, through contact 211 on back space magnet BSM, wire 342, through contact COM on relay R1 (now released), wire 343, through contact 179 on special relay 174, wire 344, through common contact 230 on the flick switch, wire 345, through contact 262 on the holding switch, wire 346, through the On and Off switch, wires 347 and 320 to the positive plate of the rectifier.

When using a style of register such as one having an equal number of decimal spaces between the dollar and cent wheels as there are letters in "Dollars" on a preprinted check, a special cam is placed on the rack, such cam being shown in Fig. 12. The purpose of the extreme high portion 348 of this cam is to break the left register shift impulse by means of an LSH control contact 500 (Fig. 25) which, on check writing machines, is incorporated additionally and actuated by the lower control slide 307. Occasionally, a "9" appears in the dollar column of the register. This "9" is the equivalent of a negative or credit value and when the carriage is tabulated to decimal position the "9" wheel in the dollar position will sense a credit balance and cause the machine to automatically shift into a credit position which would be a misoperation. Also, when an injection of "one" into the check numbering register takes place, it often occurs that a "9" is registered in the ten cent digit wheel of the register. This will also have the same effect upon the machine and, to prevent the sensing of the credit balance when the check number is increased by one, the LSH control contact 500 is broken by the cam surface 348. It can be seen that a shift impulse (credit) would be interrupted in the following manner: From ground (Fig. 27) to sensing finger SH of L REG 94 through wire 501 to the LSH contact 500 now opened by the lower cam control surface 348 (Fig. 12).

Automatic printing with banked registers

When registers are disposed on the carriage side by side as are the first two shown on the left in Fig. 2, the invention provides means to move from one register to another by spacing without tabulation. This control is effected by means of a special slow release relay 174 (Fig. 26). In conjunction with this relay there is a special control cam 350, a portion of which is shown in Fig. 22. This is really the same as joining adjacent ends of cams such as are shown in Figs. 16 and 17, with their A. C. levels overlapping as indicated at 351. There must be as many of these joined cams as there are totalizers abutting each other. When this cam 350 reaches depression 351 for any one register, the control slide drops back, opening the printing magnet circuit. At this position the A. C. contact remains closed permitting current to flow so that the star or the triangle printing circuit, as the case may be, can cause the proper symbol to be printed. Assuming that it is the star symbol, if the left register is clear, the clear signal mechanism 352 (Fig. 27) will close a circuit as follows: From ground on machine, through mechanism 352, wire 353, through star contact ST on relay R3, wire 354, through control contact ST, wire 355, through contact ST on relay R2 (which is operated), wires 356 and 357, through the star magnet ST, wires 358 and 337, to the closed contact COM on relay R9, wire 338 back to the rectifier as previously traced, causing the star magnet ST to print a star. It is to be noted that, at the same time that this circuit is closed over wire 357, leading to the star magnet, another circuit is also closed over a wire 359 leading from wire 357 through star coil of special relay 174, wire 360, to wire 343, contact 179 on relay 174 to wire 344 which is in the return circuit of the rectifier previously traced. This energizes the special relay 174 which is provided with an R1 contact 178 and the break contact 179 which is in the return circuit of all the relays and magnets except relay R1. The contact 178 completes a circuit for relay R1 which opens the main return circuit at its contact COM, so no numeral printing can then take place. Thus, if a credit balance exists, or the relay R3 is to be energized for a transfer, the mechanism has an opportunity to return to normal before the next balance can be printed. Relay 174 is a slow release relay which holds the digit printing circuits open until the star has been printed and has spaced the carriage to the level COM, of cam 350 (Fig. 22). The two separate coils of the relay 174 operate on a common armature from either a star or a triangle impulse independently. The return circuit for both coils is joined and goes through the contact 179 of this relay. This contact is adjusted to break very late in the stroke so that contact 178 of this relay, which makes immediately, can energize relay R1 to establish circuits for shifting the carriage if another credit balance is in the next register, or to operate relay R3 to transfer from a left to a right register. Therefore, the star is printed, the carriage spaced, a negative total is sensed, and a transfer may be made, after which the special relay 174 releases, and relay R1 is deenergized, and printing of the next total can take place.

*Tabulation to selected distribution column*

This enables the carriage to be tabulated to a particular column and then have the carriage stopped and not started again to print until a starting solenoid button 156 is operated. The tabulation is generally effected by means of the usual skip tabulation key. In combination with this starting solenoid 157, there is employed a special cam which in all respects is like that shown in Fig. 16, except that the right hand A. C. level thereof is twice as long, as shown by the dotted lines in said figure. When the carriage is tabulated to a position to bring this cam into place and the carriage stops, only the A. C. control contact is closed, the double-width A. C. level preventing the usual closing of the common control contact COM. Therefore, the printing circuits are open and no printing takes place. However, a return circuit for the printing magnets is provided through the starting solenoid 157. When the plunger 156 thereof is pushed in, it closes three contacts called respectively "LOCK," "COM," and "SP COM." The "lock" contact when closed locks up the starting solenoid over a holding circuit as follows: From ground, wire 361, through contact "LOCK," wire 362, through coil of the starting solenoid 157, wire 363, through starting solenoid control contact ST SOL, wire 364, to break contact 179 on special relay 174, wire 344 to rectifier as previously traced. If the first number to be printed is a zero, and we desire to space instead of printing a zero, the space-star switch 321 is moved to the SP position and the circuit is as follows: From ground on the register, through the usual circuit for the zero, to the zero contact on R4, over wire 365, through space contact SP on relay R2 (which is released), wire 366, to the center connection of the ST-SP switch, wire 367, through the space magnet SP, wire 368, through space-common contact SP-COM and common contact COM on the starting solenoid 157, thence over wires 369 and 337, to contact COM on relay R9, wire 338, and to rectifier as previously traced. If the first number is a significant digit such as a "six," then the circuit is as follows: From the registers over the usual circuit to the 6 magnet, wire 370, through control contact 2-0, wires 371 and 336, and 372, Fig. 26, through common contact COM, on starting solenoid 157, wires 369 and 337 to the rectifier as previously traced. When either the space magnet SP, or a numeral magnet 1—9 is energized, the carriage is spaced and the special cam is moved one step to bring the higher common level COM into play to close the common control contact COM and establish the return circuit, after which the printing of the rest of the total proceeds in the usual manner. At the time the common cam level COM is effective, the starting solenoid control contact ST SOL is opened by this level of the cam and opens the holding circuit for the starting solenoid, which releases, opening its lock contacts which are then restored to normal.

*Credit balance lock-up device*

In this feature of the invention, whenever the machine is ready to print a negative balance, the carriage locks up as a signal to the operator. As shown in the drawings, the return circuit for the printing magnets passes through a contact nominated COM BK on relay R4, which relay operates when a negative total is to be printed, opening this contact, and, therefore, printing cannot occur and the machine stops. When the plunger 153 of the credit balance solenoid 154 is pressed, it closes contacts LOCK and COM associated therewith. The locking circuit for the credit balance solenoid is established as follows: From ground, wires 361 and 373, lock contact LOCK of the solenoid 154, wire 374, coil of solenoid 154, wires 375 and 343, break contact 179 on special relay 174, wire 344 back to the rectifier as previously traced. When the total is printed and tabulation takes place, this return circuit is opened either at contact COM on the flick switch 230 or at the contact 362 on the holding switch, in which case the solenoid 154 is deenergized. The return circuit for the printing of negative totals when the plunger 153 is pushed, is established through the contact COM on credit balance solenoid 154 as follows: Assuming numeral "5" is to be printed, then a circuit extends from the registers, through contacts 5 on relays R3, R4, and R5 to the 5 magnet, then over wire 370, through control contact 2—0, wire 371, through the control contact COM, wire 337, through contact COM on relay R9, wire 338, through contact COM on actuator switch, wire 339, through contact 150 on timing magnet, wire 340, and then, since the contact COM BK on relay R4 is open, through contact COM on credit balance solenoid 154, wires 376 and 341, through contact 211 on back space magnet BSM, wire 342, back to the rectifier as previously traced. Therefore, it is seen that when the contact COM BK on relay R4 is opened to stop printing, the contact COM on the credit balance solenoid 154, when closed, establishes a parallel return circuit for the printing magnets.

*Automatic proof symbol circuit*

*Left cross register.*—The purpose of this circuit is to obtain a star symbol from the left register if the same has been manually cleared. If a figure is left in the register, however, printing of the automatic symbol cannot occur, and the keyboard would be locked up. Printing of this automatic symbol is made possible by a special proof cam which is placed on the tabulator rack so that the control contact A. C. only is closed in the position in which the symbol is to be printed. The upper slide 306 is never operated when taking an automatic proof from the left register. On a machine adapted for this type of operation, it is necessary to adjust the star contact ST on relay R2 so that it will remain closed whether the relay R2 is operated or released. The proof cam 378 is shown in Fig. 20, in which the lever 377 is such as to close the control contact A. C. only. When this operation is desired, the carriage is tabulated to the proper column to bring the cam 378 into position. The level 379 of this cam is ineffective to operate any control contacts but the machine is now manually operated to print the total, which the operator reads from her records, not from the balance in the machine. The general operation briefly is as follows: We will assume that we wish to get the proof symbol from the left register. When the operator prints a balance forward on the sheet manually, it is entered into the right cross register but not into the left cross register. She then prints the deposit, and a withdrawal, which are entered into both the right and left cross registers. The machine then automatically prints the total in the right cross register, and if this register is cleared, a star is printed. As this right cross register is cleared, the totalizer cams are set to subtract this total from the left register. The machine is then tabulated to the proof symbol column where the cam 378 comes into play and the carriage is stopped. The operator here manually enters into the left cross register, the balance forward noted on her records. If this is the same as she previously has entered into the right cross register, the left register will be cleared and a star will be automatically printed. If this entry does not correspond to what was entered on the sheet, the register will not be cleared, the symbol will not be printed and the machine will lock up. As an example, take the following: The operator enters a $100.00 balance forward in the right cross register.

| Left Cross | Right Cross |
| --- | --- |
| plus 50.00 | plus 100.00 balance fwd. |
| minus 50.00 | plus 50.00 deposit |
| minus 100.00 | minus 50.00 withdrawal |
| minus 100.00 total | plus 100.00 total |
| plus 100.00 added manually | |
| * symbol printed | |

This is not entered in the left register. She then enters a $50.00 deposit in both registers, also a $50.00 withdrawal in both registers. She then has in the right register a total of plus $100.00. This is automatically printed and the right register is cleared and a symbol is printed automatically. At the same time this total of plus $100.00 is subtracted from the left register, giving it a total of minus $100.00. The carriage then is tabulated to the proof of symbol column, when the operator looks at her record sheet and notes the balance forward and adds it manually into the left register. It is seen that if she has previously entered the correct balance forward, this last operation will clear the left register and the cam 378 will be moved to the position where the proof symbol will be automatically printed.

*Right register.*—If the right register is used for the automatic proof symbol, a cam such as shown in Fig. 21 is employed. This cam 380 has a manual level 381 on the lower plate thereof as well as an A. C. level 382 thereon. It also has an upper plate 383 which has a level 384, which is on the same plane as the A. C. portion of a standard cam. This level 384 controls the energization of the transfer relay R3. On a machine using the right register for a proof of symbol operation, it is necessary to permanently close the contact R3 on relay R1 and the triangle contact TRI on relay R2. In this instance, of course, since the right register is to be used for the proof symbol, the left register is used for the balance, in which case the contact ST on relay R2 is not permanently closed as previously mentioned. In other respects the operation is as before. The permanent closing of contact R3 on relay R1 holds relay R3 operated, thereby opening its star contact ST and closing its triangle contact TRI.

*Automatic date printing*

By placing an automatic date cam 385 (Fig. 14) on the tabulator rack, the automatic date will print in any position of the carriage. The number of dates printed depends entirely upon the number of such cams on the carriage. This cam comprises lower plate 385 and upper plate 386. When the carriage is tabulated to the date column, as the date cam (Fig. 14) comes into play, the level 387 of the lower plate 385 closes the control contact A. C. closing a circuit to the key-lock magnet, which immediately energizes and locks up all keys as well as the space bar so that the date cannot be printed on top of written matter. The level 388 of the upper plate 386 is adapted to close the control contacts R1 and TRI. A level 389 of the plate 386 is adapted to open the control contact R1—BK and to close the control contact DATE—RET. The low level 390 of the plate 385 is adapted to break the control contact A. C. which eliminates the possibility of repeat printing of the date.

When tabulating to the date column, the control contact A. C. is closed by the lower plate 385 at level 387. Therefore, the rectifier is supplied with current to operate the R1 and R8 relays. Relays R1 opens its contact COM and relay R8 closes its contact DATE—R2. The relay R8 is energized from the positive plate of the rectifier, wires 320 and 325, through TAB BRK switch contact TAB BK, wire 324, through coil of relay R8, wire 323, contact R8 on relay R5, wire 322, contact R9 on relay R4, to ground. Relay R1 is energized from the negative plate of the rectifier, wire 331, through control contact R1—BK, wire 391, through control contact R1, wire 392, through control contact R1 AUTO NUM, wire 393, to contact DISC on relay R2, wire 394, wire 327, to coil of relay R1, wire 328, and wire 320 to the positive plate of the rectifier. As the carriage proceeds to the date printing column, the high level 389 of the plate 386 closes the date return control contact DATE RET and opens the control contact R1—BK. This deenergizes relay R1, but, since this is a slow release relay, it gives the parts time to come to rest before relay R1 fully releases and closes its contact COM. When this happens, the circuit for the date magnet is energized from the negative plate of the rectifier, wire 331, through control contact TRI closed by level 388, wires 332 and 395, through date magnet, wire 396, through the control contact DATE RET, closed at level 389, wire 397, through the contact DATE—R2 on relay R8, wires 398 and 342, through contact COM on relay R1 (not operated), wire 343, through BK contact 179 on special relay 174 over wire 344 back to the positive plate of the rectifier as previously traced. When the date magnet energizes, the date is printed and the carriage is spaced in the manner previously described. As spacing occurs, the depression 390 on cam plate 385, causes the opening of the control contact A. C. to prevent reprinting.

*Carriage return to intermediate position*

The mechanical operation of this device has already been described. As previously described, when the carriage return lever is manually operated, it opens first the A. C. contact 108 and then closes the contacts 165, 166, and 167 on the intermediate stop switch. As soon as the intermediate stop is contacted, the A. C. contact 108 is closed. This establishes the following circuits: (1) From the secondary of the transformer over wire 399, through A. C. contact 167 on the intermediate stop switch, wire 400, through A. C. contact 108, wire 315 to the rectifier, back to the other side of the secondary of the transformer over wire 316; (2) from ground through contact 166 of the intermediate stop switch, wires 401 and 326, through the coil of the tabulator solenoid TAB SOL, over wire 319, through contact TAB on relay R8, wire 320, to the positive plate of the rectifier. When the first tabulator stop is encountered, the tabulator break switch 233 is operated, opening the tabulator solenoid contact 247, and the parts come to rest, but in this case, as long as the operator holds the carriage return key down, the contact 165 on the intermediate stop switch is closed, and this is in parallel to the contacts 247, so that the relay R8 remains energized and consequently the contact TAB thereon remains closed, continuing the tabulation until the operator releases the carriage return key.

While I have described what I consider to be highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described, a plurality of digit printing magnets to effect printing of numbers from 0–9, a first control switch in circuit with the #1 printing magnet of said digit printing magnets, a second control switch in circuit with the remainder of said digit printing magnets, means including an upper control slide and a lower control slide for operating said first and second control switches respectively, a movable carriage and a special control cam on the carriage shaped to operate said control slides to close the first control switch and open the second whereby the #1 digit printing magnet may be impulsed and not the others, as the cam passes said upper and lower control slides.

2. In a machine of the class described having a series of magnets to effect printing of numbers from 0–9 inclusive and a power source connected thereto, a symbol control switch, a special relay, a pair of contacts controlled by said relay and closed when said relay is deenergized, one of said contacts being connected to the #1 printing magnet and the other to the symbol control switch, a control switch in series with the printing magnets from 2—0, a control switch connected between said power source and said magnets, a moving carriage and a control cam thereon to engage said switches to close the symbol switch, open the 2—0 magnet switch and close the power switch whereby only the #1 printing magnet is energized when the carriage has moved to a predetermined column.

3. In a machine of the class described having a series of printing magnets to effect printing of numbers from 0–9 inclusive and a power source connected thereto, a triangle control switch, a circuit from the triangle control switch to the #1 printing magnet, a relay associated with said circuit and a pair of contacts in said circuit adapted to be closed when said relay is deenergized, an A. C. control switch disposed between said power source and the whole circuit, a 2—0 control switch connected to the 2—0 magnets, a movable carriage and a control cam on the carriage adapted when the carriage reaches a predetermined position to close the triangle and the A. C. control switches and to open the 2—0 control switch whereby only the #1 printing magnet is energized.

4. In a machine of the class described; a series of digit printing magnets; a circuit therefor; a plurality of symbol printing magnets including a star printing magnet and a triangle printing magnet; respective symbol control switches in circuit with said symbol printing magnets; a double wound slow release relay in parallel with said symbol printing magnets; a break contact controlled by said double wound slow release relay to hold said magnet circuit open until one of the symbol printing magnets has been energized, thereby providing a timed interval permitting various associated operations to be effected; a movable carriage; an A. C. control switch; and a control cam on the carriage and shaped to close the A. C. control switch and one of the symbol control switches, at a predetermined point in the movement of the carriage.

5. In a machine of the class described; a series of digit printing magnets; a plurality of symbol printing magnets including a star printing magnet and a triangle printing magnet; respective symbol control switches in circuit with said magnets; a plurality of associated relays including a starting relay; a common return circuit for all of said relays and printing magnets except said starting relay; a break contact on said starting relay which, when said starting relay is energized, will open said common return circuit; a double wound slow release relay in parallel with said symbol printing magnets to hold said magnet circuit open until one of said symbol printing magnets has been energized, thereby providing a timed interval for effecting various associated operations; a make contact controlled by said double wound slow release relay, and in circuit with said starting relay; a break contact also controlled by said double wound slow release relay and in circuit with all of the relays and magnets except said starting relay; a movable carriage; an A. C. control switch; and a control cam on the carriage and shaped to close the A. C. control switch and one of the symbol control switches, at a predetermined point in the movement of the carriage.

6. In a machine of the class described, star and triangle symbol printing magnets, respective symbol control switches in circuit with said magnets, a plurality of other relays and printing magnets including a starting relay, a slow release relay having coils disposed respectively in parallel with said symbol magnets, a make contact controlled by said slow release relay and in circuit with the starting relay, a break contact also controlled by said slow release relay and in circuit with all the relays and magnets except the starting relay, a movable carriage, an A. C. control switch, and a control cam on the carriage shaped, to close the A. C. control switch and one of the symbol control switches, at a predetermined point in the movement of the carriage.

7. In a machine of the class described; a movable carriage; a date printing magnet; a date printing circuit including a common return circuit; means operated by the date printing magnet when energized to print a date in a predetermined position of said movable carriage; a triangle control contact for closing said date printing circuit; an A. C. control contact; a normally open date return control contact in circuit with said A. C. control contact and said triangle control contact; starting relay make and break control contacts;

a slow release starting relay in circuit with said starting relay control contacts and having a break contact in said date printing circuit for providing a time interval for said movable carriage to settle preparatory to the energization of said date printing magnet; means including an upper control slide and a lower control slide for operating said A. C., triangle and date return control contacts and said starting relay control contacts; and upper and lower control cams on said carriage shaped to operate said control slides, as the cams pass said upper and lower control slides the lower of said control slides operable to first close said A. C. control contact, the upper of said control slides operable thereafter to first close said triangle control contact and said starting relay make control contact and directly thereafter to open said starting relay break control contact and close said date return contact.

8. In a machine of the class described; a movable carriage; a date printing magnet; a date printing circuit including a common return circuit; means under control of the date printing magnet when energized to print a date in a predetermined columnar position of said movable carriage; a triangle contact for energizing said printing circuit; an A. C. control contact; a normally open date return contact in circuit with said A. C. control contact and said triangle control contact; starting relay make and break control contacts; a slow release starting relay in circuit with said starting relay control contacts and having a break contact in said date printing circuit for providing a time interval for said movable carriage to settle preparatory to the energization of said date printing magnet; means including an upper control slide and a lower control slide for operating said A. C., triangle and date return contacts and said starting relay control contacts; upper and lower control cams on said carriage shaped to operate said control slides, as the cams pass said upper and lower control slides the lower of said control slides operable to first close said A. C. control contact, the upper of said control slides operable thereafter to first close said triangle control contact and said starting relay make control contact and directly thereafter to open said starting relay break control contact and close said date return contact; and means for spacing the carriage after said date printing has been effected.

9. In a machine of the class described; a movable carriage; a date printing magnet; a date printing circuit including a common return circuit; means under control of the date printing magnet when energized to print a date in a predetermined columnar position of said movable carriage; an A. C. control contact; key locking means operable whenever said A. C. control contact is closed; a triangle control contact for closing said date printing circuit; a normally open date return contact in circuit with said A. C. control contact and said triangle control contact; starting relay make and break control contacts; a slow release starting relay in circuit with said starting relay control contacts and having a break contact in said date printing circuit for providing a time interval for said movable carriage to settle preparatory to the energization of said date printing magnet; means including an upper control slide and a lower control slide for operating said A. C., triangle and date return contacts and said starting relay control contacts; and upper and lower control cams on said carriage shaped to operate said control slides, as the cams pass said upper and lower control slides the lower of said control slides operable to first close said A. C. control contact, the upper of said control slides operable thereafter to close said triangle control contact and said starting relay make control contact and directly thereafter to open said starting relay break control contact and close said date return contact and finally to open said A. C. contact, thereby opening the circuit for the date printing magnet when spacing has taken place.

10. In a machine of the class described, a movable carriage, a date printing magnet, means operated by the magnet when energized to print a date, a plurality of control contacts including an A. C. control contact, a triangle control contact, a date return control contact, an R1 make control contact, and an R1 break control contact, a control cam on the carriage to operate said control contacts, an R1 slow release relay, means on the cam to close the R1 make control contact, the triangle control contact and the A. C. control contact before the date column is reached, means on the cam to open the R1 break control contact and to close the date return control contact when the date column is reached, means operated by the date printing means to space the carriage after the date is printed, and means operated by the cam to open the A. C. control contact after spacing has taken place.

EDWIN O. ROGGENSTEIN.

REFERENCES CITED

The following references are of record in the file of this patent:

UNITED STATES PATENTS

| Number | Name | Date |
| --- | --- | --- |
| 1,939,316 | Pittman | Dec. 12, 1933 |
| 2,099,123 | Kurowski | Nov. 16, 1937 |
| 2,172,749 | Going | Sept. 12, 1939 |
| 2,216,627 | Pittman | Oct. 1, 1940 |
| 2,412,537 | Roggenstein | Dec. 10, 1946 |